Patented June 15, 1954

2,681,367

UNITED STATES PATENT OFFICE 2,681,367

7-ISOPROPYL-12-METHYL-2,3,4,9,10,12-HEXAHYDRO-2-PHENANTHRONE

Willard M. Hoehn, Wilmette, Ill., assignor to G. D. Searle & Co., Chicago, Ill., a corporation of Illinois No Drawing. Application November 22, 1952, Serial No. 322,173

1 Claim. (Cl. 260—590)

The present application relates to a new polyhydrophenanthrone derivative and, specifically, to the 7-isopropyl-12-methyl-2,3,4,9,10,12-hexahydro-2-phenanthrone of the structural formula

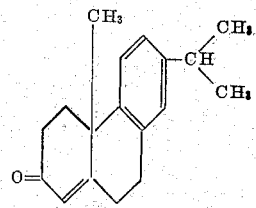

This compound is of value in medicinal chemistry as a medicament for the regulation of gonadal hormone dysfunction. The compound is also of great value as an intermediate in the organic synthesis of valuable pharmaceutical compositions of matter.

Thus mild oxidation transforms the 9-methylene radical to a 9-keto radical; this 2,9-dioxo derivative forms a dioxime which can be reduced to the 2,9-diamino compound. Equal quantities of this diamino compound and the 2,9-diketone condense in such a manner as to lead to hard resin masses suitable as thermoplastics.

The claimed composition also yields enol ethers and enol esters. Treatment of the enol ethers with N-bromosuccinimide in a solution containing a tertiary amine, preferably pyridine, leads to the 9-bromo derivative. This bromo radical can be converted to a dialkylaminoalkoxy radical; quaternization of the 9-dialkylaminoalkoxy ether with a methohalide yields ganglion blocking agents. Other valuable compositions of matter are obtained by the reduction of the $\Delta^1$-2-oxo system to the 1,11-dihydro derivatives and the 2-hydroxy compounds.

The examples below illustrate one of the more advantageous procedures of practicing this invention and the products produced thereby. However, the invention is not to be construed as limited in spirit or in scope by the details set forth. In these examples temperatures are indicated in degrees centigrade (° C.), pressures in millimeters (mm.) of mercury and quantities of materials in parts by weight.

Example 1

A mixture of 400 parts of dehydroabietinol and 200 parts of boric acid is heated at 150° C. for an hour and then twice distilled at 0.025 mm. pressure and about 160–163° C. Additional yield can be obtained by thermal decomposition of the borate ester left in the distillation residue. The resulting 1-ethylidene derivative shows an ultraviolet absorption maximum at 264 millimicrons with a molecular extinction coefficient of 940, and at 276 millimicrons with an extinction coefficient of 868. A 1% chloroform solution shows a specific rotation $\alpha_D = +185°$.

A solution of 387.5 parts of this ethylidene derivative in 960 parts of chloroform and 1000 parts of carbon tetrachloride is ozonized at −50° C. in the course of 70 minutes so that 56.5 parts of ozone are absorbed. The reaction mixture is then dropped slowly into hot water and the organic layer is separated and freed from solvent by vacuum distillation. The residue is taken up in ether and washed successively with water, 1% aqueous sodium hydroxide solution and again with water to neutrality. The ether solution is dried over calcium sulfate, filtered and concentrated in vacuo. The residual light yellow oil is dissolved in 3500 parts of a 10% acetic acid solution in methanol. 360 parts of Girard's reagent "P" (pyridinoacetohydrazide hydrochloride) are added and the mixture is heated at reflux temperature for two hours and then poured over a mixture of 2000 parts of ice and 560 parts of 39% sodium hydroxide solution. The resulting solution is washed with ether, rendered acid by addition of concentrated sulfuric acid and ether extracted. The ether extracts are washed with water, dilute sodium hydroxide and finally with water to neutrality, dried over calcium sulfate and filtered. Vacuum distillation of the solvent yields a reddish-brown liquid which is taken up in petroleum ether and thus applied to a chromatographic column containing alumina.

Elution with petroleum ether and a solution of 2% benzene in petroleum ether yields the 7-isopropyl - 12 - methyl-1,2,3,4,9,10,11,12-octahydro-1-phenanthrone which can be distilled at about 145–155° C. and 0.07 mm. pressure. This compound forms a crystalline semicarbazone which, recrystallized from 90% methanol, melts at about 227–228° C. The oxime melts at about 167–170° C. when crystallized from the same solvent. The 2,4-dinitrophenylhydrazone, crystallized from ethanol, melts at about 88–91° C. The 7-isopropyl - 12 - methyl-1,2,3,4,9,10,11,12-octahydro-1-phenanthrone has the structural formula

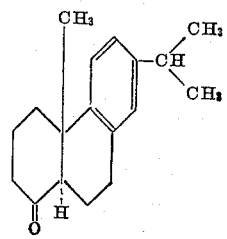

Example 2

To a solution of 100 parts of 7-isopropyl-12-methyl-1,2,3,4,9,10,11,12-octahydro-1-phenanthrone in 400 parts of methanol are added 400 parts of a 4% sodium methoxide solution in methanol and 105 parts of benzaldehyde. The resulting mixture is shaken, heated slowly for 10 minutes to 75° C. and the solvent is removed in vacuo. Water is added and the mixture is rendered acid by treatment with 10% hydrochloric acid. This acidic solution is extracted with ether and the extract is washed successively with water, dilute sodium hydroxide solution and again with water to neutrality. The ether extract is then dried over anhydrous sodium sulfate, filtered and evaporated in vacuo. Vacuum distillation at 0.05 mm. pressure yields first the unreacted benzaldehyde. At 200–204° C. the 2-benzal-7-isopropyl-12-methyl-1,2,3,4,9,10,11,12-octahydro-1-phenanthrone is collected which has an ultraviolet absorption maximum at 290 millimicrons. It has the structural formula

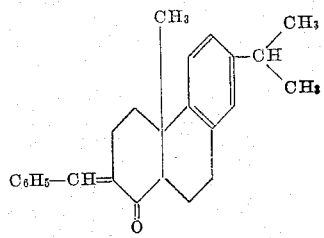

Example 3

98 parts of 2-benzal-7-isopropyl-12-methyl-1,2,3,4,9,10,11,12-octahydro-1-phenanthrone are dissolved in 700 parts of anhydrous ether and added to a solution of 30 parts of lithium aluminum hydride in 3500 parts of ether. After heating at reflux temperature for 150 minutes, 450 parts of ethyl acetate are slowly added, followed by 180 parts of 50% ethanol and then 750 parts of water. The ether layer is separated and the insoluble, inorganic hydroxides are washed with ether. The combined ether solutions are concentrated in vacuo and the residual gum, consisting of 2-benzal-7-isopropyl-12-methyl-1,2,3,4,9,10,-11,12-octahydro-1-phenanthrol is redissolved in 700 parts of ether. After addition of 200 parts of anhydrous sodium sulfate the ether solution is filtered, the filtrate is treated with 50 parts of boric acid and the ether is removed by distillation. The residue is slowly heated to 160° C. at which temperature a vacuum of about 15 mm. pressure is applied for a period of 90 minutes. Vacuum distillation at 0.04 mm. pressure and about 158–160° C. yields the 2-benzal-7-isopropyl-12-methyl-2,3,4,9,10,12-hexahydrophenanthrene, the ultraviolet absorption spectrum of which shows the following maxima: a maximum at 249.5 millimicrons and a molecular extinction coefficient of 12,000; one at 256 millimicrons and a molecular extinction coefficient of 14,100; one at 266 millimicrons and a molecular extinction coefficient of 15,750; and one at 288 millimicrons and a molecular extinction coefficient of 16,750. The distillate is dissolved in 1070 parts of dichloromethane and the amount of ozone required for the reaction with one double bond is passed through the solution at a temperature of −50° C. The reaction mixture is dropped slowly into 1000 parts of hot water and the resulting mixture is steam distilled and then cooled. The water is removed by decantation and the gummy residue extracted with ether. This extract is washed with water, 5% aqueous sodium hydroxide solution and then again with water to neutrality. The extract is then dried over anhydrous sodium sulfate, filtered and vacuum distilled at 0.07 mm. pressure. At about 120–125° C. 7-isopropyl-12-methyl-2,3,4,9,10,12-hexahydro-2-phenanthrone is collected which has the structural formula

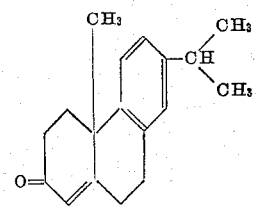

The ultraviolet absorption spectrum shows a maximum at 235 millimicrons with a molecular extinction coefficient of about 14,000.

I claim:
A compound of the structural formula

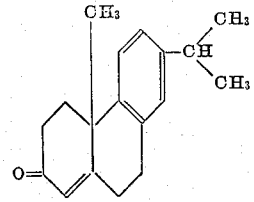

No references cited.